United States Patent [19]

Douglas et al.

[11] Patent Number: 4,684,113
[45] Date of Patent: Aug. 4, 1987

[54] UNIVERSAL HOLDING FIXTURE

[75] Inventors: William A. Douglas, East Lansdowne; Theodore Ozer, Wallingford, both of Pa.

[73] Assignee: The Boeing Company, Seattle, Wash.

[21] Appl. No.: 655,618

[22] Filed: Sep. 28, 1984

[51] Int. Cl.$^4$ ............................................. B25B 11/00
[52] U.S. Cl. ..................................... 269/21; 269/266; 269/303
[58] Field of Search ................. 294/64 R, 65; 269/21, 269/266, 303, 304

[56] References Cited

U.S. PATENT DOCUMENTS 3,559,980  2/1971  Terai ................................. 269/296
3,853,313 12/1974  Appenzeller et al. ................ 269/21
4,527,783  7/1985  Collora et al. ...................... 269/21

Primary Examiner—Frederick R. Schmidt
Assistant Examiner—Judy J. Hartman
Attorney, Agent, or Firm—Jones, Tullar & Cooper

[57] ABSTRACT

A universal holding fixture for holding a workpiece having a contoured holding surface. The fixture includes a plurality of workpiece engaging rods which are individually adjustable in height to thereby reproduce the contour of the contoured holding surface. A holding force is generated through the rods to hold the workpiece to the fixture.

11 Claims, 3 Drawing Figures

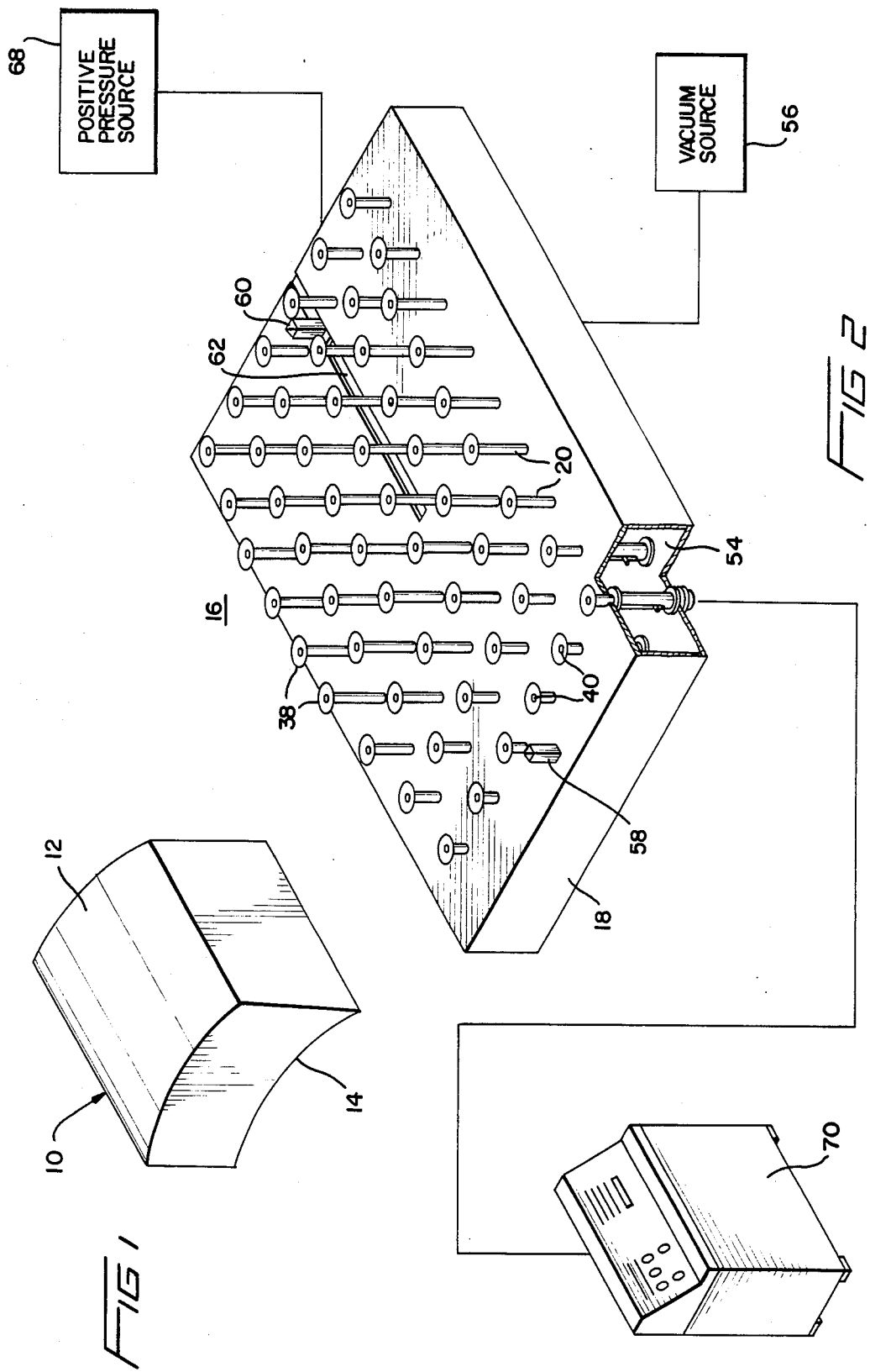

UNIVERSAL HOLDING FIXTURE

TECHNICAL FIELD

The present invention relates generally to a tool having the capability of holding a workpiece of any contour, i.e., to a universal fixture.

BACKGROUND OF THE INVENTION

It is often necessary to rigidly hold and support a contoured part during machining. A separate fixture is needed for each part due to the complex contours involved. Large costs are involved in creating, altering, and storing and setting up customized fixturing.

It would be desirable to have a single fixture which can support different contoured workpieces reliably and effectively.

The following U.S. patents are noted as bearing in a general way on the subject matter of the present invention: 2,729,040; 3,108,791; 3,821,867; 3,765,359; 4,034,517; 4,066,249; 4,088,312 and 4,200,271.

The U.S. Pat. No. 2,729,040 discloses a vacuum jig for holding contoured sheet parts. It requires a spring metal chuck carrying plate which flexes to specific contours. This requirement severely limits the possible contours which may be generated. This jig will not accept parts with small radius curves nor will it accept parts with inflective curves. This jig also requires a vacuum sealing flange around the entire part periphery. Such a flange limits the size and peripheral shape of the parts which may be held. The U.S. Pat. No. 2,729,040 does not provide for automatic indexing nor a consistent means of locating a part on the contour.

The U.S. Pat. No. 4,088,318 discloses a spring-biased system which utilizes diaphragms and V-blocks to clamp its rods in place. It utilizes vacuum in conjunction with the rods. However, the vacuum is applied to all the rods in every instance. It is not, therefore, very flexible.

SUMMARY OF THE INVENTION

We believe the present invention provides a unique, universal fixture which rigidly holds and supports many variations of complex contoured parts during machining greatly reducing the number and associated costs of customized fixturing. The fixture according to the present invention eliminates the need for using separate fixtures to hold multiple parts. It consequently eliminates the fabrication, maintenance, storage and set-up costs associated with such multiple fixtures. Novel use of the combination of modern computer capabilities, positive air pressure and vacuum allows rapid adjustment, clamping and unclamping. This unique method of clamping facilitates repeatability of part location and part orientation. It provides rigid support and consistent part contour while at the same time accepting large variations of parts.

According to the present invention, the contour of the support surface of the workpiece to be machined or otherwise operated upon is matched by the universal fixture. For this purpose, the fixture includes a number of workpiece engaging rods which are individually adjustable in height to be engaged. Once the contour is reproduced, the individual rods are locked to hold their height position. A holding force is generated using the rods to hold the workpiece to the adjusted rods. The workpiece can then be operated upon, for example, machined. All, or part of the total number of rods may be employed for a given workpiece, depending on the size of the workpiece.

BRIEF DESCRIPTION OF THE DRAWINGS

Three figures have been selected to illustrate a preferred embodiment of the present invention. The figures are schematic in nature. They are, however, sufficiently detailed to enable the person skilled in the art to understand and practice the invention. Illustrated are:

FIG. 1, which is a perspective view of a workpiece having a contoured surface which is typical of the workpieces held by the fixture of the present invention;

FIG. 2, which schematically illustrates the fixture in combination with a numerical controller, a pneumatic source and a vaccum source.

DETAILED DESCRIPTION

Figure 3:
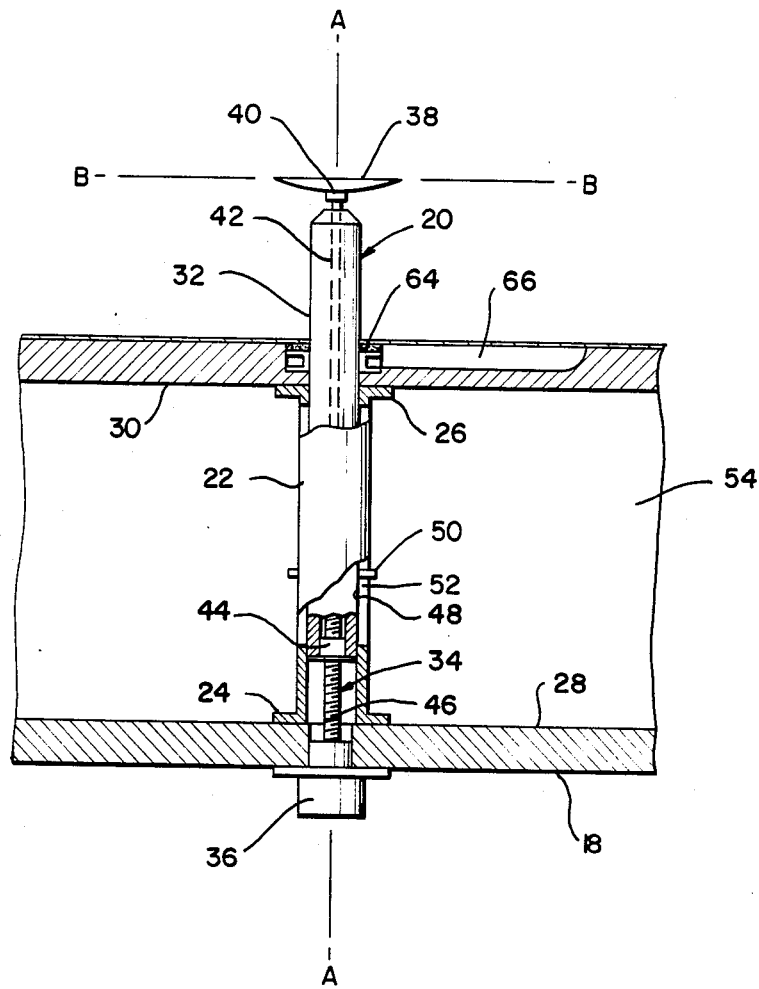
FIG. 3, which shows details of a support rod of the fixture shown in FIG. 2.

In the aerospace industry the machining of workpieces with contoured surfaces is quite prevalent. Such a workpiece is shown in a simplified manner in FIG. 1. The workpiece 10 includes, for example, a top contoured surface 12 which may require machining or perhaps hand finishing. Typically, the bottom surface of the workpiece is also contoured, although not necessarily identically to the top surface. In this case, the workpiece becomes somewhat unmanageable due to the contour of the bottom or supporting surface 14. The present invention shown in FIGS. 2 and 3 can effectively hold and support the workpiece 10 during the machining and/or finishing operation.

For this purpose, the present invention comprises a universal holding fixture 16. The fixture 16 includes a support table 18 to which a plurality of workpiece engaging rods 20 are mounted. The rods 20 are adjustable in height relative to the table 18 so that together they can define a contour which reproduces the contour of the surface 14.

Details of the workpiece engaging rods 20 are shown in FIG. 3. Each rod 20 includes a stationary guide bushing 22 supported by flanges 24 and 26 between bottom walls 28 and top wall 30, respectively, of the support table 18. A support rod 32 is mounted within the guide bushing 22 and is reciprocally displaceable relative thereto and to the support table 18. This support rod 32 is reciprocally displaceable by a ball bearing screw 34 driven by a motor 36.

The support rod 32 defines a free end situated externally of the support table 18. Attached to the free end of the support rod 32 is a suction pad 38. The suction page 38 is swivably mounted or gimbaled to the free end of the support rod 32. At the bottom and center of the suction pad 38 there is situated an opening 40 connected to a passage 42 extending through the support rod 32. The passage 42 receives and supports therein the outer housing 44 of the ball bearing screw 34. The outer housing 44 supports the ball bearings (not shown) of the ball bearing screw 34 and is threadly engaged within the passage 42 of the support rod 32 to retain the ball bearing screw 34 in assembly with the support rod 32. The support rod 32 therefore reciprocates relative to the axis A—A with the outer housing 44, which in turn reciprocates due to the engagement of the ball bearings with the threads of a screw 46 of the ball bearing screw 34.

Situated on the outer surface of the support rod 32 is an opening 48, which opens into passage 42, and a pin 50. The pin 50 is received within an elongated slot 52 formed in the wall of the guide bushing 22 and permits rotation of the screw 46 to translate into reciprocal movement of the housing 44 and support rod 32. At the fully retracted position of the support rod 32, the opening 48 is covered by the inside surface of the guide bushing 22. As the support rod 32 is lifted from its fully retracted position, the opening 48 registers with the elongated slot 52. The opening 48 thereafter remains in registry with the slot 52. The slot 52, and consequently the passage 42 via the opening 48, communicates with the interior space 54 of the support table 18.

During operation a vacuum is generated in the interior space 54 by a vacuum source 56 (FIG. 2). The support table 18 thus serves not only a supporting function but also as a vacuum manifold. The vacuum generated in the space 54 extends through the slot 52, the opening 48, the passage 42 and ultimately to the opening 40. The application of a vacuum at the openings 40 results in a holding force on the workpiece 10 resting on the suction pads 38.

Since the holding forces generated by the vacuum source are normal forces, i.e., they are directly normal to the plane of contact B—B (FIG. 3) defined by the suction pad 38, they are not adequate to effectively reaction transverse forces, i.e., forces directly parallel to the plane B—B. To react these forces and insure proper alignment to the workpiece 10, the fixture 16 is provided with a pair of spaced apart pins 58 and 60. The pin 60 is adjustable along a track 62 formed in the top wall of the support table 18. The pins 58 and 60 are received in corresponding notches in the workpiece 10 so that all transverse forces, generated by a machining tool, for example, can be effectively reacted.

To lock the support rods in their various positions, adjustable locking ring 64 is located concentric with the support rod 32 in a slot 66 formed in the top wall of the support table 18. A positive pressure from, for example, a pneumatic source 68 (FIG. 2) is communicated to the slot 66. This positive pressure causes the lock ring 64 to grip the support rods 32 and hold it from moving in its reciprocating direction. A network of slots 66 are provided in the top wall of the support table 28 which are individually connected to the source 68, or are interconnected with only one being connected to the source 68.

A controller 70 (FIG. 2) is provided for controlling the operation of the motors 36. Programming of the fixture 16 may be accomplished by digitizing the controller off of an existing workpiece or by numerically inputting the workpiece contour into the controller. These programs may be stored in the controller memory or disk for instant recall.

Since each of the workpieces engaging rods 20 is individually adjustable in height, any surface contour can be reproduced. The workpiece having the reproduced surface contour can then rest on the suction pads and held by the holding force and pins 58 and 60. The workpiece can be easily released by removing the vacuum thereby terminating the holding force.

The holding fixture 16 is not only adaptable to a variety of surface contours, but to a variety of different size workpieces. The individual adjustment of the rods 20 lends further flexibility to the fixture since not all the rods need to be used, i.e., unless a rod is extended from its fully retracted position, no vacuum is drawn through opening 40 because the opening 48 is covered by the inside wall of the guide bushing 22. Also, the adjustability of the pin 60 along track 62 is compatible with the intent to handle a variety of different size workpieces.

What is claimed:

1. A universal holding fixture for holding a workpiece having a fixture engaging surface, comprising:
   support means including a vacuum manifold;
   a plurality of adjustable workpiece engaging rods mounted to said support means for engaging the fixture engaging surface of the workpiece, said workpiece engaging rods being adjustable in height relative to said support means;
   means for adjusting the height of each workpiece engaging rod independently of the workpiece and relative to said support means so that said plurality of adjusted rods reproduces the contour of the fixture engaging surface of the workpiece; and
   means for generating a holding force for holding the workpiece in engagement with said rods, the holding force acting through said rods, wherein:
   said means for generating a holding force includes vacuum generating means connected to the vacuum manifold of said support means through which a vacuum, generated by said vacuum generating means, is communicated to each rod; and
   each workpiece engaging rod includes a stationary guide bushing having a longitudinal slot open to the vacuum in said vacuum manifold, and a support rod in said bushing displaceable in height from a retracted position by said adjusting means independently of the workpiece and relative to said guide bushing and the vacuum manifold, said support rod defining a free end situated externally of said vacuum manifold, said free end including a suction pad which engages the fixture engaging surface of the workpiece, said support rod further defining a passage terminating at one end at said pad and having an opening at its other end, said support rod passage being in communication with said manifold when said opening is aligned with said bushing slot when said support rod is not in its retracted position, and when said support rod is in its retracted position, said opening is not in alignment with said bushing slot, and said passage is not in communication with said manifold.

2. The universal holding fixture as defined in claim 1, further wherein:
   the holding force acts through selected ones of said rods whose height has been adjusted by said adjusting means.

3. The universal holding fixture as defined in claim 1, wherein the suction pad is swivably mounted to the free end of said support rod.

4. The universal holding fixture as defined in claim 1, wherein said adjusting means includes a motor and a ball bearing screw threadedly connected at one end to said support rod and connected at its other end to said motor.

5. The universal holding fixture as defined in claim 4, wherein said adjusting means further includes a numerical controller connected to said motor.

6. The universal holding fixture as defined in claim 1, further comprising:
   means for locking each rod in its adjusted height.

7. The universal holding fixture as defined in claim 6, wherein said locking means includes a locking ring arranged concentrically with said support rod, said locking ring being radially displaceable to engage said support rod to hold said support rod in its adjusted position.

8. The universal holding fixture as defined in claim 7, wherein said locking means includes means for pneumatically actuating said locking ring.

9. The universal holding fixture as defined in claim 8, wherein the support means defines a slot for each workpiece engaging rod in which an associated locking ring is situated and through which said means for pneumatically actuating said locking ring acts on said locking ring.

10. The universal holding fixture as defined in claim 1, further comprising:
   workpiece locating means mounted to said support means for locating the workpiece relative to the workpiece engaging rods.

11. The universal holding fixture as defined in claim 10, wherein the workpiece locating means comprises a fixed pin and an adjustable pin spaced apart on said support means.

* * * * *